(12) United States Patent
Shimoda (10) Patent No.: US 8,472,294 B2
(45) Date of Patent: Jun. 25, 2013

(54) INFORMATION REPRODUCTION DEVICE AND INFORMATION REPRODUCTION METHOD

(75) Inventor: Daisuke Shimoda, Osaka (JP)

(73) Assignee: Panasonic Corporation, Osaka (JP)

( * ) Notice: Subject to any disclaimer, the term of this patent is extended or adjusted under 35 U.S.C. 154(b) by 21 days.

(21) Appl. No.: 13/232,534

(22) Filed: Sep. 14, 2011

(65) Prior Publication Data

US 2012/0002521 A1   Jan. 5, 2012

Related U.S. Application Data

(63) Continuation of application No. PCT/JP2010/001288, filed on Feb. 25, 2010.

(30) Foreign Application Priority Data

Apr. 2, 2009   (JP) .................. 2009-090335

(51) Int. Cl.
*G11B 7/00* (2006.01)

(52) U.S. Cl.
USPC ............ 369/53.15; 369/47.14; 369/275.3

(58) Field of Classification Search
USPC .......... 369/47.14, 53.12, 53.13, 53.15, 53.17, 369/275.3
See application file for complete search history.

(56) References Cited

U.S. PATENT DOCUMENTS

| 5,715,221 | A  * | 2/1998 | Ito et al. ................. 369/47.14 |
|---|---|---|---|
| 2001/0018727 | A1 * | 8/2001 | Ando et al. ................. 711/112 |
| 2002/0013925 | A1 * | 1/2002 | Senshu ................. 714/769 |
| 2003/0137910 | A1 * | 7/2003 | Ueda et al. ................. 369/47.14 |
| 2004/0208097 | A1 * | 10/2004 | Kim et al. ................. 369/53.15 |
| 2006/0087945 | A1 * | 4/2006 | Hwang et al. ............ 369/53.17 |
| 2006/0156056 | A1 * | 7/2006 | Yoshida et al. ................. 714/5 |
| 2006/0181800 | A1 * | 8/2006 | Yoshida et al. ................. 360/69 |
| 2007/0189143 | A1 | 8/2007 | Sasaki |
| 2007/0276605 | A1 * | 11/2007 | Blacquiere et al. ............ 702/19 |
| 2007/0286046 | A1 * | 12/2007 | Nagar et al. ............... 369/53.24 |
| 2008/0071981 | A1 * | 3/2008 | Hung et al. ................. 711/112 |

FOREIGN PATENT DOCUMENTS

| JP | 2001-175424 | 6/2001 |
|---|---|---|
| JP | 2005-267825 | 9/2005 |
| JP | 2007-516542 | 6/2007 |

OTHER PUBLICATIONS

"1.B Physical Format Specifications for BD-R," White Paper BD-R Physical Specification, 5th edition, published by Blu-ray Disc Association, pp. 1-39, Oct. 2010.

* cited by examiner

*Primary Examiner* — Thomas Alunkal
(74) *Attorney, Agent, or Firm* — McDermott Will & Emery LLP (57) ABSTRACT

A process of reproducing information according to the present invention includes: reproducing record data recorded on an information-recording medium including a data area for recording the record data, and a defect control area for recording defect information of the data area; storing the defect information in a storage unit; and reducing a storage area of the storage unit which is used for storing the defect information.

12 Claims, 8 Drawing Sheets

INFORMATION REPRODUCTION DEVICE AND INFORMATION REPRODUCTION METHOD

CROSS-REFERENCE TO RELATED APPLICATION

This is a continuation of PCT International Application PCT/JP2010/001288 filed on Feb. 25, 2010, which claims priority to Japanese Patent Application No. 2009-090335 filed on Apr. 2, 2009. The disclosures of these applications including the specifications, the drawings, and the claims are hereby incorporated by reference in their entirety.

BACKGROUND

The present invention relates to devices and methods for reproducing information from information-recording media.

Optical disc reproducing devices for reading out a defect list recorded on a disc and reproducing data based on the defect list have been known. For example, in the case where block (A) is a defect and data is alternatively recorded in block (B), data is reproduced from the block (B) without access to the block (A).

In recent years, Blu-ray Discs which are large-capacity optical discs for high quality video such as high definition television are being developed. Since Blu-ray Discs are high quality and large capacity, defects on Blu-ray Discs are strictly controlled (see, e.g., http://www.blu-raydisc.com/Assets/Downloadablefile/BD-R_Physical_3rd_edition_0602f1-15268.pdf "White Paper BD-R Physical Specifications"). The maximum size of a defect list recorded on a Blu-ray Disc is 256 kilobytes in the case of single layer disc, and 512 kilobytes in the case of double layer disc.

Further, PC data, file system information, or data of music and video (hereinafter also referred to as "audio visual (AV) data"), etc. are recorded on the optical discs. Data reliability is important for the PC data and file system information, whereas for AV data, data reliability is not that important as long as the reproduced sound or video is of acceptable quality. Rather, it is important that data transmission is not interrupted.

Japanese Patent Publication No. 2005-267825 discloses a technique in which defect management is performed for PC data and file system information to ensure data reliability, whereas no defect management is performed for AV data so as not to decrease transfer rate.

SUMMARY

As described above, in the optical disc reproducing devices, a defect list read from a disc has to be stored in a memory to reproduce data based on the defect list. Thus, the capacity of the memory mounted on the optical disc reproducing device is large. In particular, devices which reproduce double-layer Blu-ray Discs need to have a 512 kilobyte area for storing the defect list. Thus, an increase in memory capacity is a serious problem. If the defect list is not stored in the memory, and the defect list is read from the disc every time the data is reproduced, the data transmission speed is reduced.

It is an objective of the present invention to provide an information reproduction device capable of reducing a capacity of a memory to be mounted on the information reproduction device, and a method for reducing the same.

A process of reproducing information according to the present invention includes: reproducing record data recorded on an information-recording medium including an data area for recording the record data, and a defect control area for recording defect information of the data area; storing the defect information in a storage unit; and reducing a storage area of the storage unit which is used for storing the defect information.

According to the present invention, a storage area of the storage unit which is used for storing the defect information is reduced. Thus, the reduced storage area can be used for storing information other than defect information. As a result, it is possible to reduce a capacity of the storage unit (i.e., a memory) mounted on an information reproduction device.

According to the present invention, it is possible to reduce a capacity of a storage unit to be mounted in an information reproduction device.

DETAILED DESCRIPTION

Embodiments of the present invention will be described below with reference to the drawings.

First Embodiment 1-1. Information-Recording Medium

Figure 1:
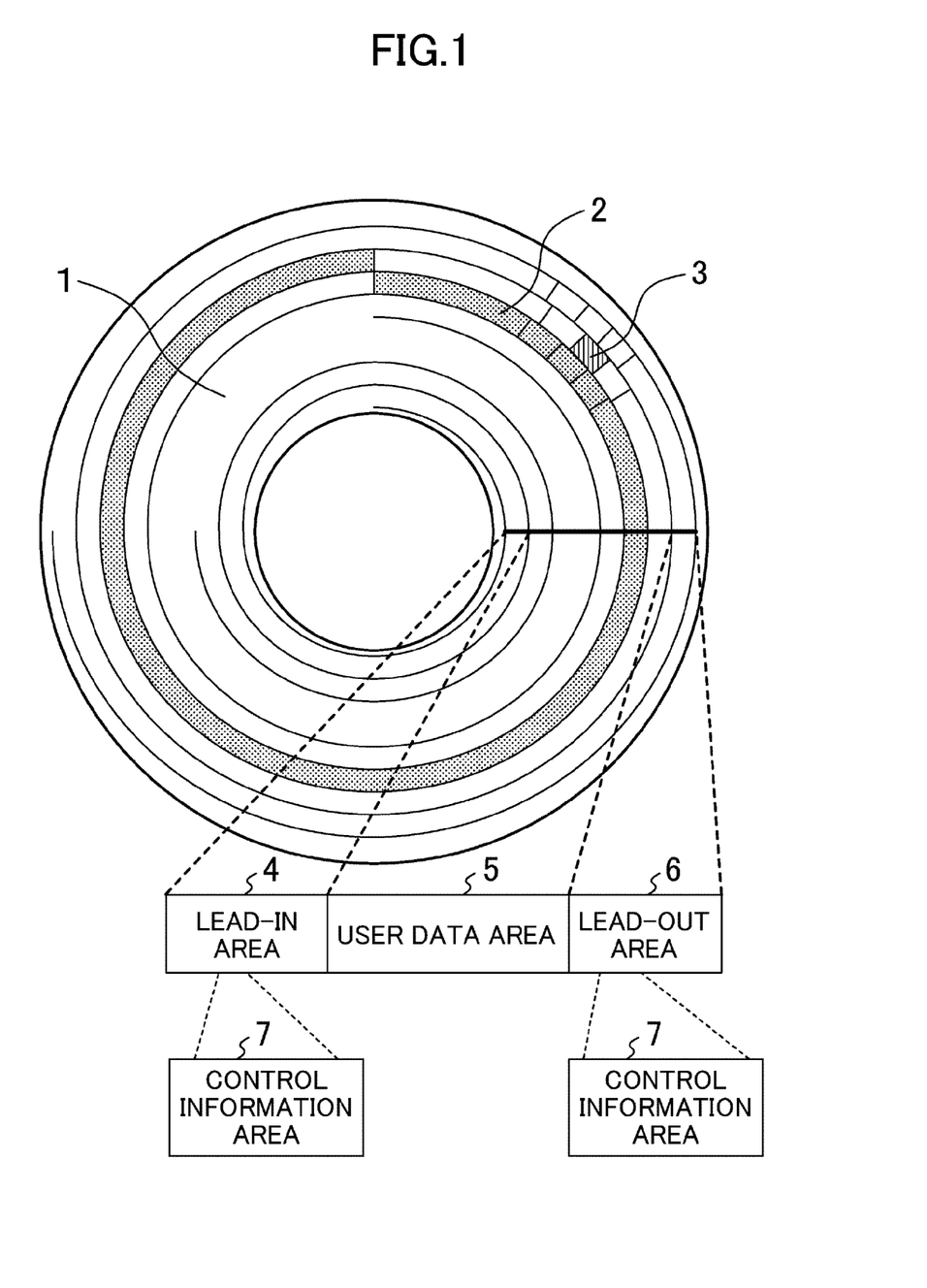
FIG. 1 shows a structure of an optical disc according to the first embodiment.

FIG. 1 shows a structure of an optical disc 1 according to the first embodiment of the present invention. The optical disc 1 is a circular plate. A spiral track 2 is formed on the optical disc 1. The track 2 includes a plurality of blocks 3. Each of the blocks 3 is a unit for error correction, which is a minimum unit for recording information and reproducing the information.

The optical disc 1 has a lead-in area 4, a user data area 5, and a lead-out area 6. User data is recorded on and reproduced from the user data area 5. The lead-in area 4 and the lead-out area 6 are provided to have an optical head (not shown) follow the track 2 even if the optical head overruns the user data area 5 when the optical head accesses information on an edge of the user data area 5. Each of the lead-in area 4 and the lead-out area 6 has a control information area (a defect control area) 7 in which control information for controlling a recording state of the optical disc 1 is recorded.

Figure 2:
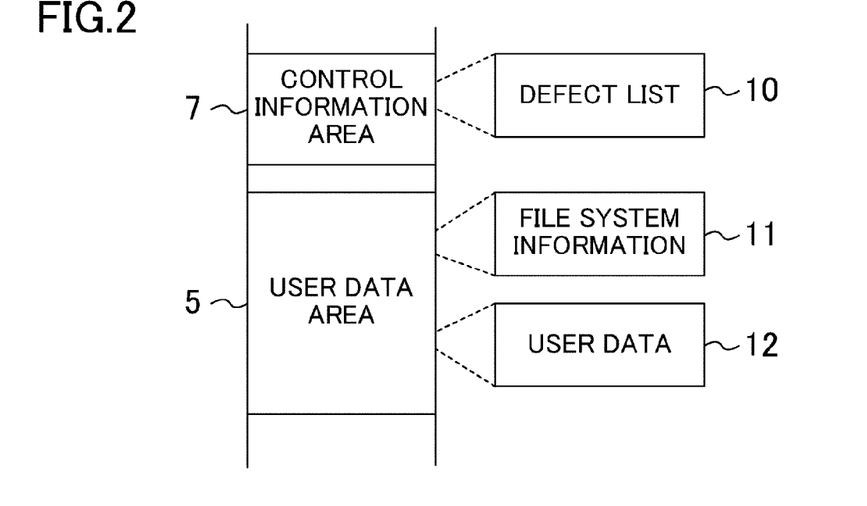
FIG. 2 shows a data configuration of the optical disc according to the first embodiment.

FIG. 2 shows a data configuration of the optical disc 1. A defect list 10 is recorded in the control information area 7. File system information 11 and user data (record data) 12 are recorded in the user data area (a data area) 5.

Figure 3:
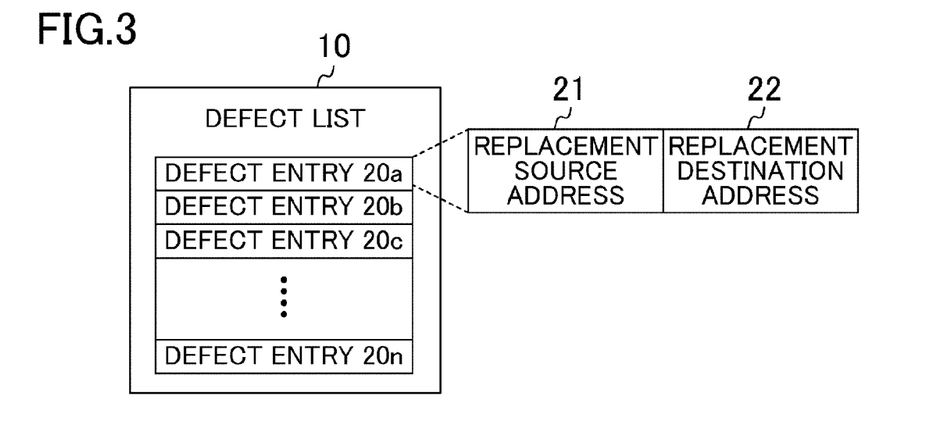
FIG. 3 shows a configuration of a defect list according to the first embodiment.

FIG. 3 shows a configuration of the defect list 10. The defect list 10 includes a plurality of defect entries 20a-20n. Each of the defect entries 20a-20n has a replacement source address 21 and a replacement destination address 22.

Figure 4:
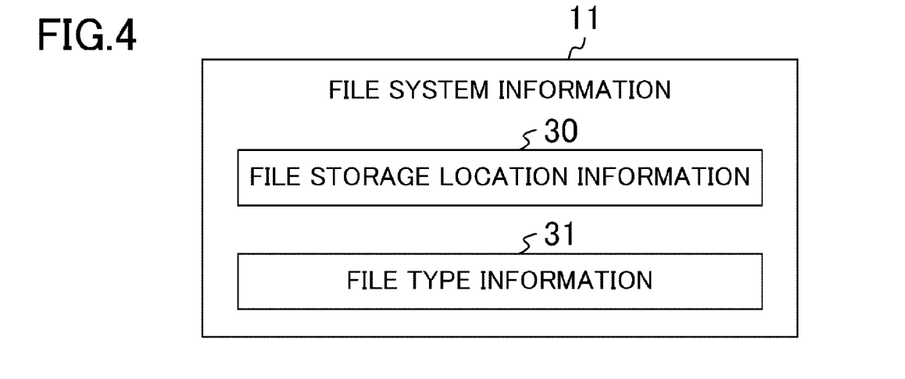
FIG. 4 shows a configuration of file system information according to the first embodiment.

FIG. 4 shows a configuration of the file system information 11. The file system information 11 includes file storage location information 30 which indicates a recording location of the user data 12, and file type information 31 which indicates whether the user data 12 is AV data or not.

1-2. Information Reproduction Device

Figure 5:
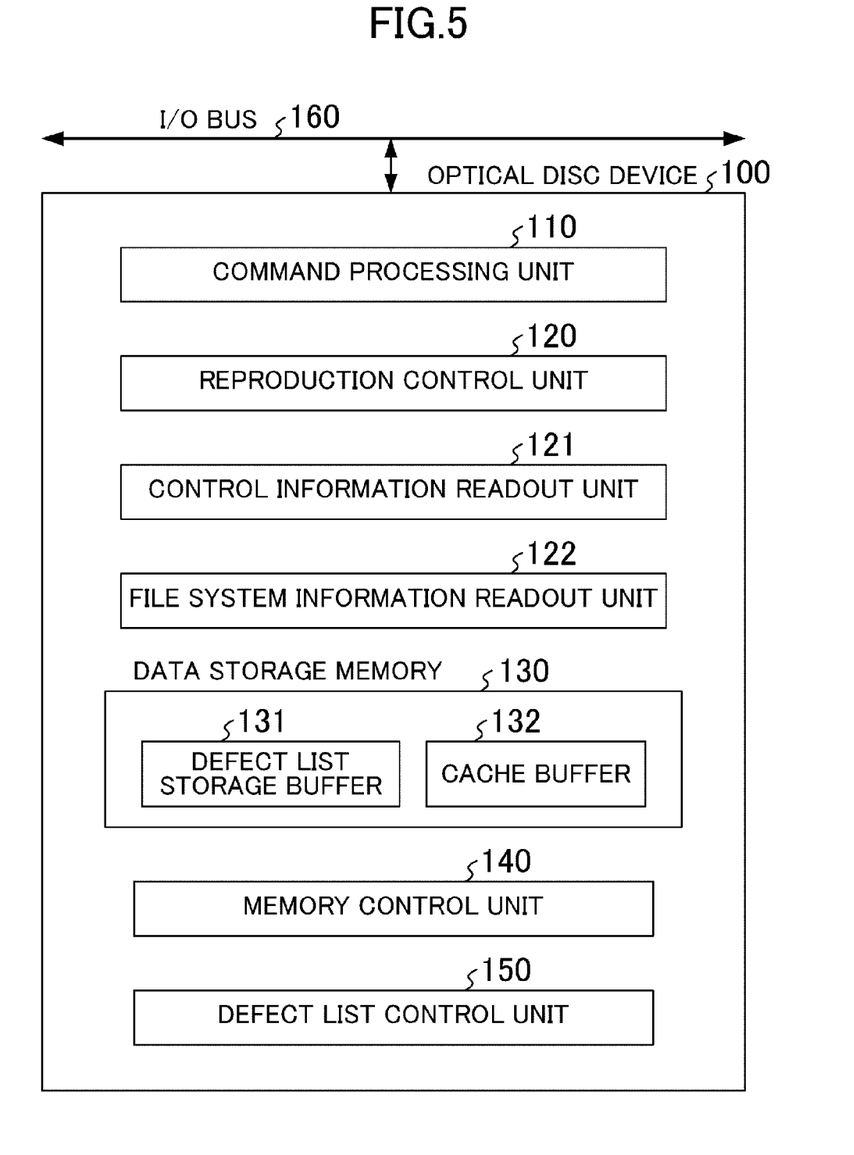
FIG. 5 shows a structure of an optical disc device according to the first embodiment.

FIG. 5 shows a structure of an optical disc device 100 according to the first embodiment of the present invention. The optical disc device 100 is connected to an I/O bus 160. The I/O bus 160 is connected to an upper control device (not shown). The optical disc device 100 is configured such that the optical disc 1 is insertable. The optical disc device 100 has a command processing unit 110, a reproduction control unit 120, a data storage memory 130, a memory control unit 140, and a defect list control unit 150.

The command processing unit 110 processes a command from the upper control device. The reproduction control unit (a reproduction unit) 120 reads out (i.e., reproduces) the user data 12. Further, the reproduction control unit 120 controls reproduction from the optical disc 1. The reproduction control unit 120 instructs a control information readout unit 121 to read a defect list 10, and instructs a file system information readout unit 122 to read file system information 11.

The data storage memory (a storage unit) 130 includes a defect list storage buffer 131 and a cache buffer 132, and stores data read from the optical disc 1. The defect list storage buffer 131 stores a defect list 10 read from the optical disc 1. The cache buffer 132 stores file system information 11 or user data 12 read from the optical disc 1.

The memory control unit 140 stores data in the data storage memory 130, and deletes the data stored in the data storage memory 130. The defect list control unit 150 controls the defect list 10 stored in the defect list storage buffer 131.

1-3. Method for Controlling Defect List

Figure 6:
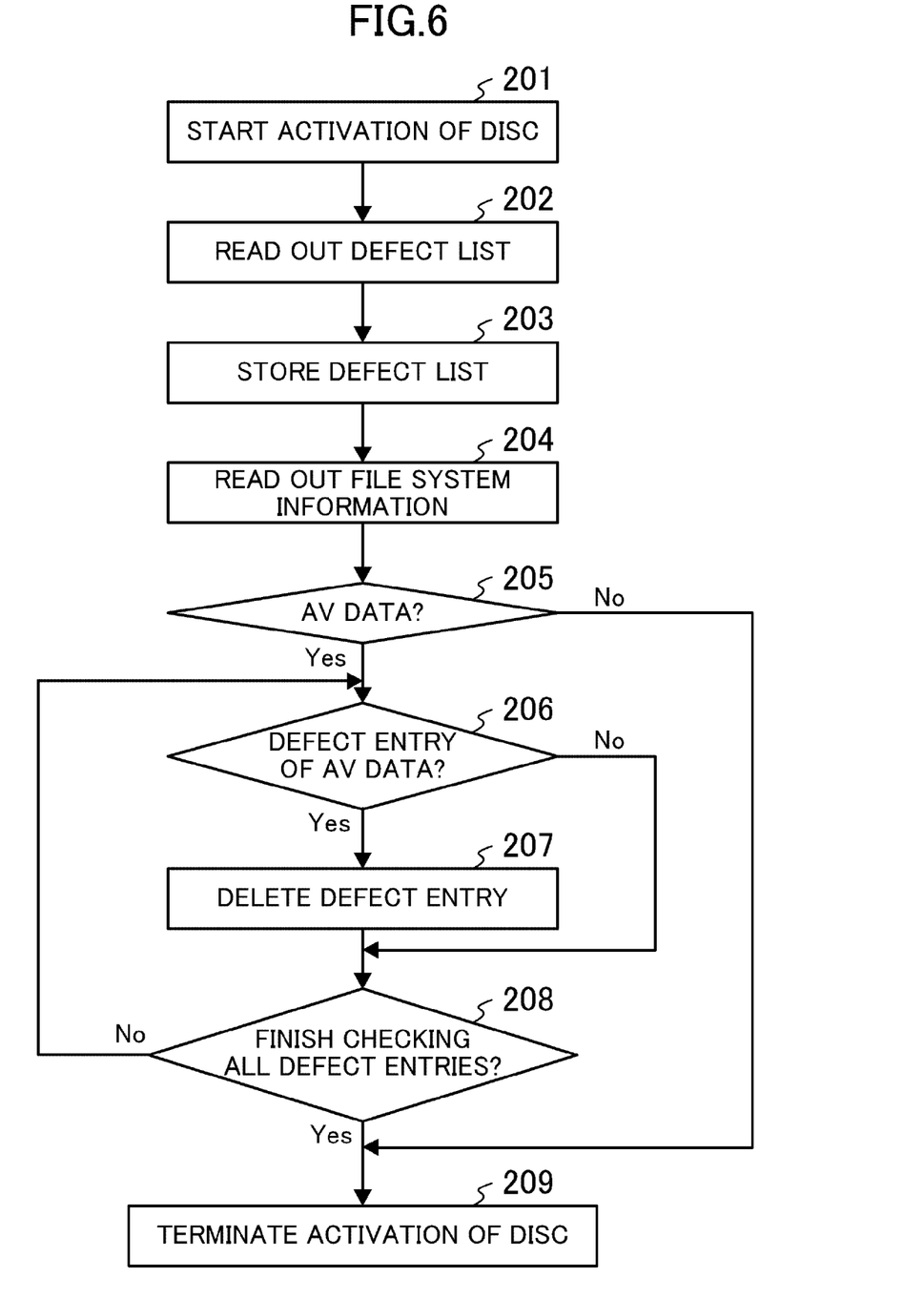
FIG. 6 is a flowchart for showing steps of controlling a defect list according to the first embodiment.

A method for controlling a defect list according to the first embodiment of the present invention will be described below. FIG. 6 is a flowchart for showing the steps of controlling a defect list according to the first embodiment of the present invention. Each of the steps of controlling a defect list according to the first embodiment of the present invention will be described below with reference to FIG. 5 and FIG. 6.

In Step 201, when the optical disc 1 is inserted in the optical disc device 100, the reproduction control unit 120 starts activating the disc.

In Step 202, the reproduction control unit 120 instructs the control information readout unit 121 to read the defect list 10 recorded in the control information area 7 of the optical disc 1.

In Step 203, the memory control unit 140 stores the defect list 10 read by the control information readout unit 121 in the defect list storage buffer 131.

In Step 204, the reproduction control unit 120 instructs the file system information readout unit 122 to read the file system information 11 recorded in the user data area 5 of the optical disc 1.

In Step 205, the reproduction control unit (a checking unit) 120 determines whether the user data 12 is AV data or not from the file type information 31 of the file system information 11 read by the file system information readout unit 122. If the user data 12 is AV data (Yes), the process goes to Step 206. If the user data 12 is not AV data (No), the process goes to Step 209.

In Step 206, the defect list control unit (a determination unit) 150 determines whether a defect entry 20 of the defect list 10 stored in the defect list storage buffer 131 is an entry of AV data or not. The defect list control unit 150 compares the replacement source address 21 (FIG. 3) in the defect entry 20 with file storage location information 30 (FIG. 4) to decide whether the entry is of AV data or not. If it is determined that the entry is of AV data (Yes), the process goes to Step 207. If it is determined that the entry is not of AV data (No), the process goes to Step 208.

In Step 207, the defect list control unit 150 instructs the memory control unit (a main unit) 140 to delete the defect entry 20 decided to have an address in the AV data, from the defect list storage buffer 131. As a result, the storage area of the data storage memory 130 which is used for storing the defect list 10 is reduced. The process of deleting the defect entry 20 is a process of allowing only part of the storage area of the defect list 10 in which a to-be-deleted defect entry 20 is stored, to be used as an area for storing information other than the defect list 10, and the process is performed by, for example, rewriting an end address in the case where the defect list control unit 150 has a start address and an end address of the defect list 10.

In Step 208, the defect list control unit 150 determines whether all of the defect entries 20 stored in the defect list storage buffer 131 have been checked or not. If all of the defect entries 20 have been checked (Yes), the process goes to Step 209. If not all of the defect entries 20 have been checked (No), the process goes to Step 206.

In Step 209, the reproduction control unit 120 terminates the activation of the disc.

The defect list is controlled according to the above steps. As a result, it is possible to reduce the capacity of the defect list storage buffer 131 in which the defect list 10 is stored.

Figure 7:
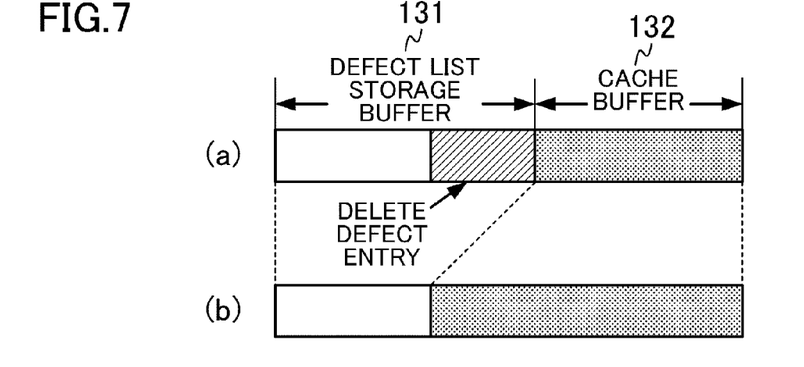
FIG. 7 shows a transition of a data storage memory.

Further, after the defect entry 20 is deleted from the defect list storage buffer 131 in Step 207, the capacity of the cache buffer 132 may be increased as shown in FIG. 7.

In the flowchart shown in FIG. 6, the processes for controlling the defect list (Steps 202-208) are executed between Step 201 starting the activation of the disc and Step 209 terminating the activation of the disc. However, the method for controlling the defect list according to the present invention is not limited to the embodiment shown in FIG. 6. For example, the processes for controlling the defect list (Steps 202-208) may be executed after Step 209 terminating the activation of the disc.

In the present embodiment, the defect entry 20 of AV data is deleted from the defect list storage buffer 131. However, a defect entry 20 of predetermined data, other than AV data, for which high reliability is not required may be deleted. Alternatively, a defect entry 20 of data that is required to be reproduced from the optical disc 1 at a transfer rate higher than a predetermined transfer rate may be deleted.

Second Embodiment 2-1. Information-Recording Medium

An information-recording medium according to the second embodiment of the present invention is similar to the information-recording medium (the optical disc 1) according to the first embodiment of the present invention. Thus, the description thereof is omitted herein.

2-2. Information Reproduction Device

The configuration of an information reproduction device according to the second embodiment of the present invention is similar to the configuration of the information reproduction device (the optical disc device 100) according to the first embodiment of the present invention. Thus, the description thereof is omitted herein.

2-3. Method for Controlling Defect List

Figure 8:
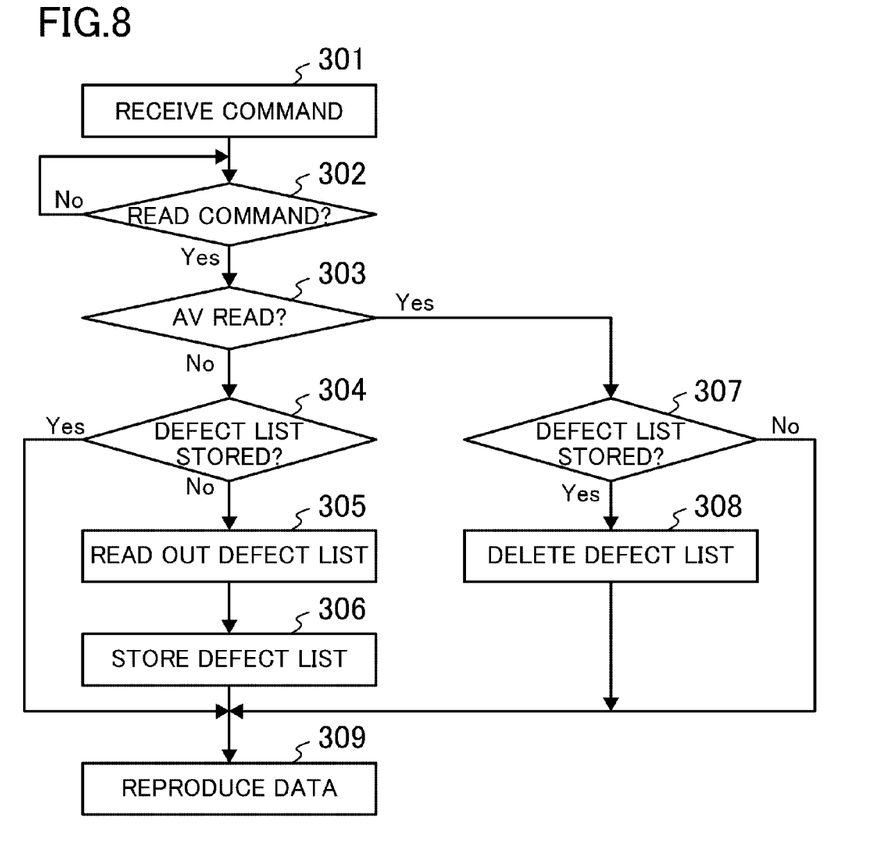
FIG. 8 is a flowchart for showing steps of controlling a defect list according to the second embodiment.

A method for controlling a defect list according to the second embodiment of the present invention will be described below. FIG. 8 shows the steps of controlling a defect list according to the second embodiment of the present invention. Each of the steps of controlling a defect list according to the second embodiment of the present invention will be described below with reference to FIG. 5 and FIG. 8.

In Step 301, after the optical disc 1 is inserted in the optical disc device 100, and activation of the disc is terminated, the command processing unit 110 receives a command for the optical disc 1 from an upper control device.

In Step 302, if the command for the optical disc 1 is a read command, the process goes to Step 303.

In Step 303, the command processing unit (a determination unit) 110 determines whether the received read command (a reproduction request) is a command to reproduce AV data or not. If it is a command to reproduce AV data (Yes), the process goes to Step 307. If it is not a command to reproduce AV data (No), the process goes to Step 304.

In Step 304, the memory control unit 140 determines whether the defect list 10 is stored in the defect list storage buffer 131 or not. If the defect list 10 is stored (Yes), the process goes to Step 309. If the defect list 10 is not stored (No), the process goes to Step 305.

In Step 305, the reproduction control unit 120 instructs the control information readout unit 121 to read the defect list 10 recorded in the control information area 7 of the optical disc 1.

In Step 306, the memory control unit 140 stores the defect list 10 read by the control information readout unit 121 in the defect list storage buffer 131.

In Step 307, the defect list control unit 150 determines whether the defect list 10 is stored in the defect list storage buffer 131 or not. If the defect list 10 is stored (Yes), the process goes to Step 308. If the defect list 10 is not stored (No), the process goes to Step 309.

In Step 308, the defect list control unit 150 instructs the memory control unit (a main unit) 140 to delete the defect list 10 stored in the defect list storage buffer 131. As a result, the storage area of the data storage memory 130 which is used for storing the defect list 10 is reduced. The process of deleting the defect entries 20 is a process of allowing only part of the storage area of the defect list 10 in which a to-be-deleted defect entry 20 is stored, to be used as an area for storing information other than the defect list 10, and the process is performed by, for example, rewriting an end address in the case where the defect list control unit 150 has a start address and an end address of the defect list 10.

In Step 309, the reproduction control unit 120 starts reading the user data 12.

The defect list is controlled according to the above steps. As a result, it is possible to reduce the capacity of the defect list storage buffer 131 in which the defect list 10 is stored.

Figure 9:
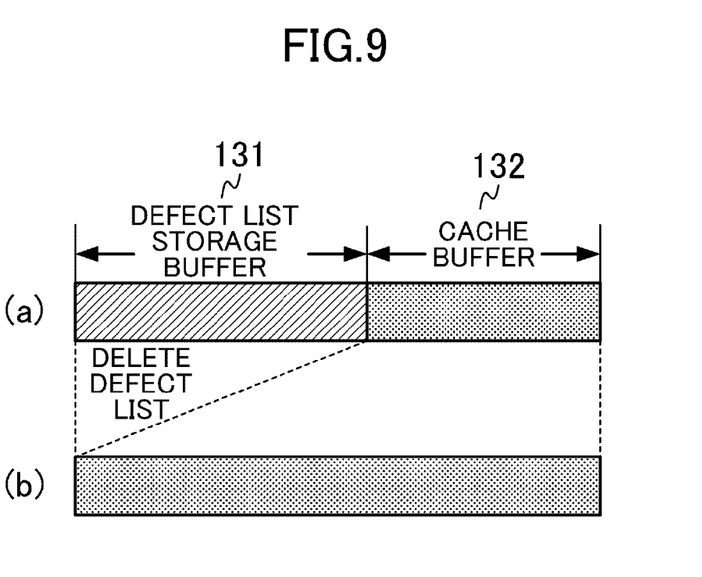
FIG. 9 shows a transition of a data storage memory.

After the defect list 10 is deleted from the defect list storage buffer 131 in Step 308, the capacity of the cache buffer 132 may be increased as shown in FIG. 9.

In the present embodiment, the defect list 10 is deleted if the received read command (a reproduction request) is a command to reproduce AV data. However, the defect list 10 may be deleted if the read command is for reading predetermined data, other than AV data, for which high reliability is not required. Alternatively, the defect list 10 may be deleted if the read command is for reading data which is required to be reproduced from the optical disc 1 at a transfer rate equal to or higher than a predetermined transfer rate.

Third Embodiment 3-1. Information-Recording Medium

An information-recording medium according to the third embodiment of the present invention is similar to the information-recording medium (the optical disc 1) according to the first embodiment of the present invention, except a defect list 10. Thus, the defect list 10 will be described in detail below, and the descriptions of the other elements are omitted.

Figure 10:
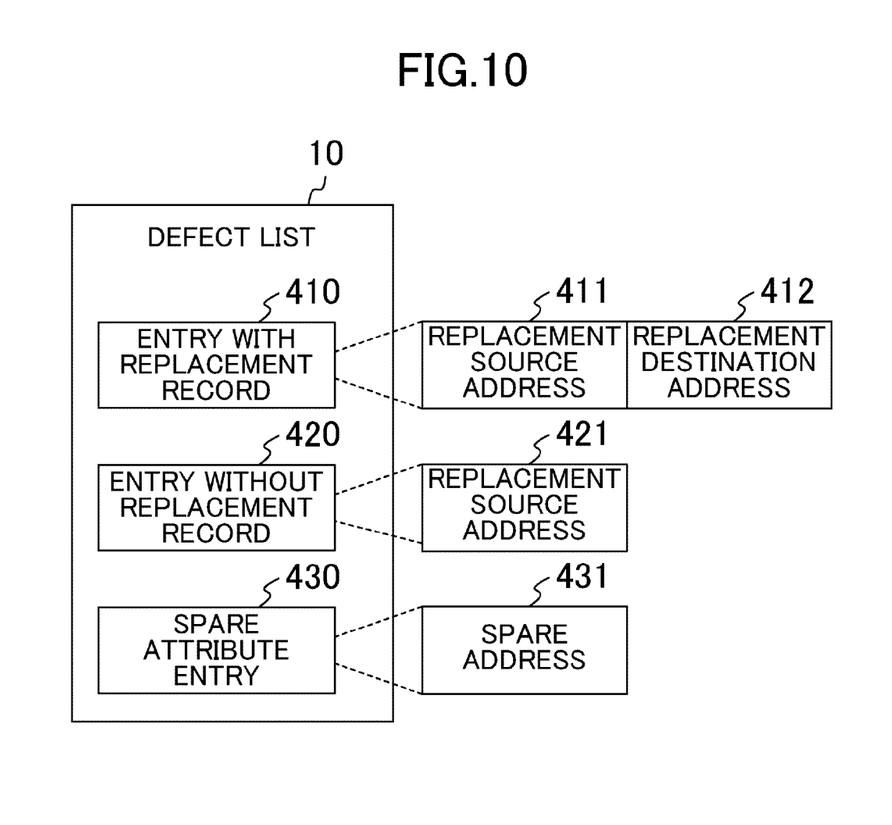
FIG. 10 shows a configuration of a defect list according to the third embodiment.

FIG. 10 shows a configuration of a defect list 10 according to the third embodiment of the present invention. The defect list 10 includes an entry 410 with replacement record, an entry 420 without replacement record, and a spare attribute entry 430.

Figure 11:
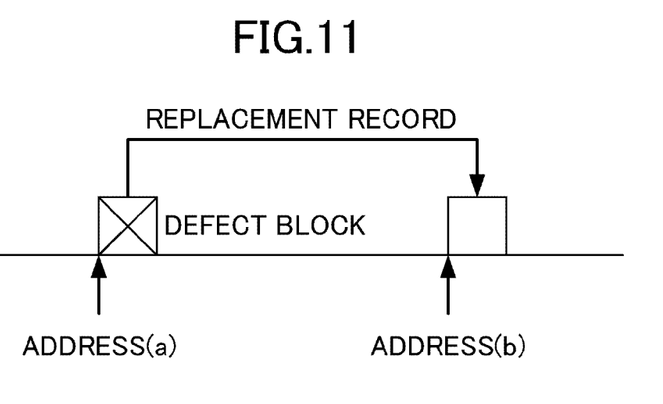
FIG. 11 shows an entry with replacement record according to the third embodiment.

The entry 410 with replacement record includes a replacement source address 411 and a replacement destination address 412. The entry 410 with replacement record is recorded when data of a defect block is recorded in a replacement destination block as shown in FIG. 11. The address (a) of the defect block is recorded in the defect list 10 as a replacement source address 411, and the address (b) of the replacement destination block is recorded in the defect list 10 as a replacement destination address 412.

Figure 12:
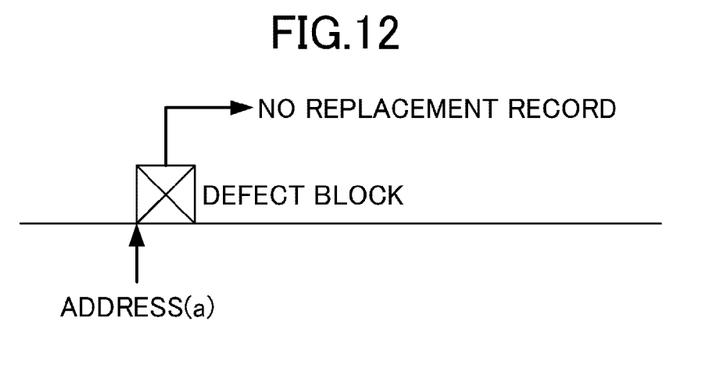
FIG. 12 shows an entry without replacement record according to the third embodiment.

The entry 420 without replacement record includes a replacement source address 421. The entry 420 without replacement record is recorded when data of a defect block is not recorded in a replacement destination block as shown in FIG. 12. The address (a) of the defect block is recorded in the defect list 10 as the replacement source address 421.

Figure 13:
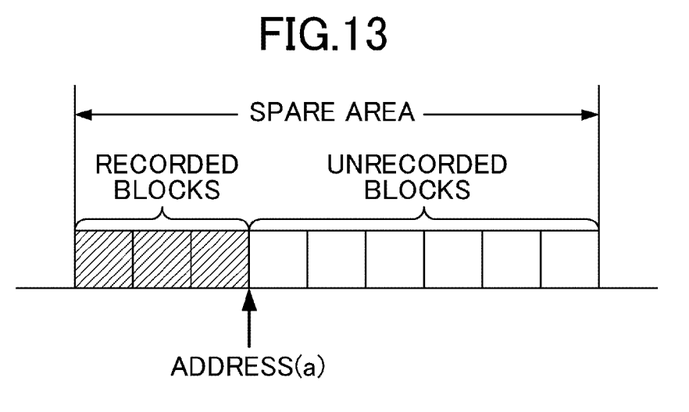
FIG. 13 shows a spare attribute entry according to the third embodiment.

The spare attribute entry 430 includes a spare address 431. The spare attribute entry 430 is recorded when a spare area contains an unused (unrecorded) block as shown in FIG. 13. The address (a) of the unused (unrecorded) block in the spare area is recorded in the defect list 10 as the spare address 431.

3-2. Information Reproduction Device

The configuration of an information reproduction device according to the third embodiment of the present invention is similar to the configuration of the information reproduction device (the optical disc device 100) according to the first embodiment of the present invention. Thus, the description thereof is omitted herein.

3-3. Method for Controlling Defect List

Figure 14:
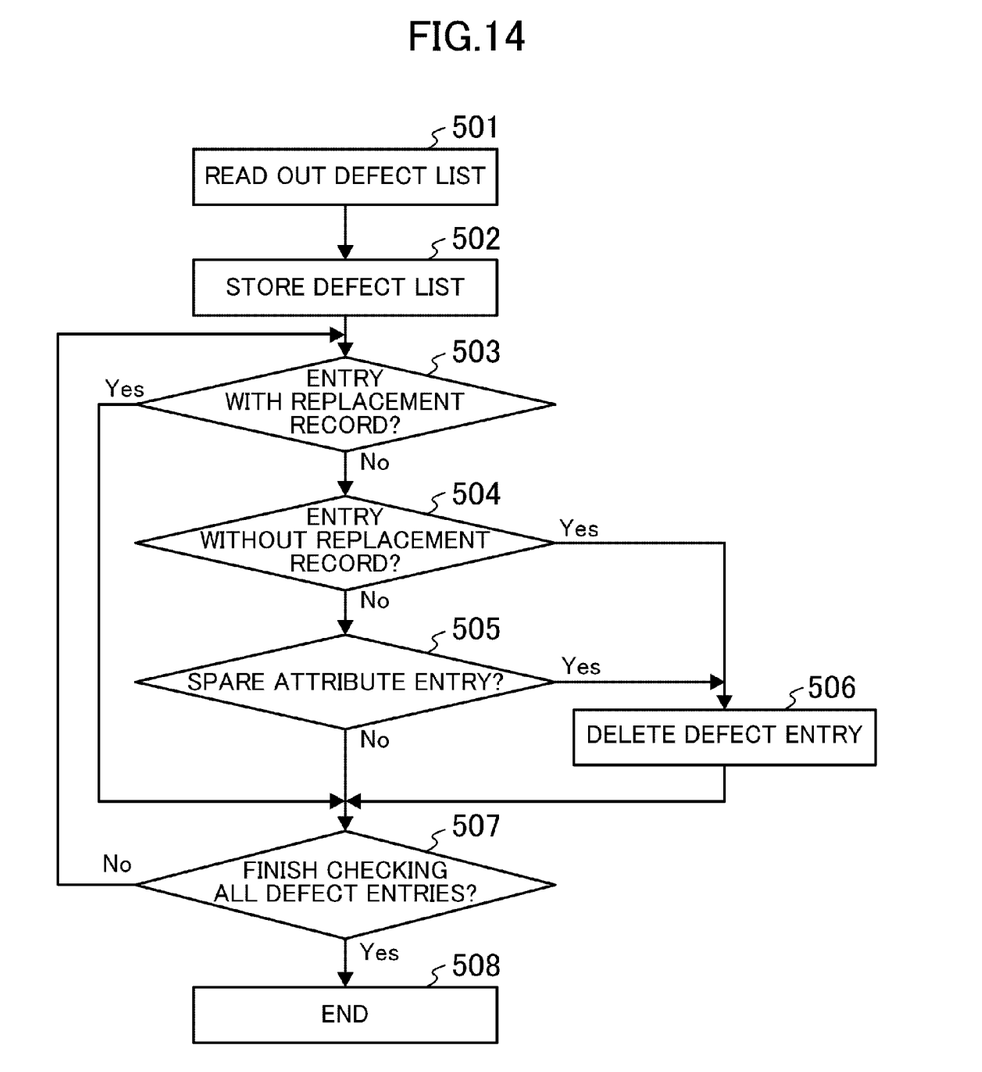
FIG. 14 shows a flowchart for showing steps of controlling a defect list according to the third embodiment.

A method for controlling a defect list according to the third embodiment of the present invention will be described below. FIG. 14 shows the steps of controlling a defect list according to the third embodiment of the present invention. Each of the steps of controlling a defect list according to the third embodiment of the present invention will be described below with reference to FIG. 5 and FIG. 14.

In Step 501, the reproduction control unit 120 instructs the control information readout unit 121 to read a defect list 10 recorded in a control information area 7 of the optical disc 1.

In Step 502, the memory control unit 140 stores the defect list 10 read by the control information readout unit 121 in the defect list storage buffer 131.

In Step 503, the defect list control unit 150 determines whether a defect entry of the defect list 10 stored in the defect list storage buffer 131 is an entry 410 with replacement record or not. If it is determined that the defect entry is an entry 410 with replacement record (Yes), the process goes to Step 507.

If it is determined that the defect entry is not an entry 410 with replacement record (No), the process goes to Step 504.

In Step 504, the defect list control unit 150 determines whether a defect entry of the defect list 10 stored in the defect list storage buffer 131 is an entry 420 without replacement record or not. If it is determined that the defect entry is an entry 420 without replacement record (Yes), the process goes to Step 506. If it is determined that the defect entry is not an entry 420 without replacement record (No), the process goes to Step 505.

In Step 505, the defect list control unit 150 determines whether a defect entry of the defect list 10 stored in the defect list storage buffer 131 is a spare attribute entry 430 or not. If it is determined that the defect entry is a spare attribute entry 430 (Yes), the process goes to Step 506. If it is determined that the defect entry is not a spare attribute entry 430 (No), the process goes to Step 507.

In Step 506, the defect list control unit 150 instructs the memory control unit (a reduction unit) 140 to delete, from the defect list storage buffer 131, a defect entry determined to be an entry 420 without replacement record in Step 504, and a defect entry determined to be a spare attribute entry 430 in Step 505. As a result, a storage area of the data storage memory 130 which is used for storing the defect list 10 is reduced. The process of deleting the defect entry is a process of allowing only part of the storage area of the defect list 10 in which a to-be-deleted defect entry is stored, to be used as an area for storing information other than the defect list 10, and the process is performed by, for example, rewriting an end address in the case where the defect list control unit 150 has a start address and an end address of the defect list 10.

In Step 507, the defect list control unit 150 determines whether all of the defect entries stored in the defect list storage buffer 131 have been checked or not. If all of the defect entries have been checked (Yes), the process goes to Step 508. If not all of the defect entries have been checked (No), the process goes to Step 503.

In Step 508, the process of controlling the defect list terminates.

The defect list is controlled according to the above steps. As a result, it is possible to reduce the capacity of the defect list storage buffer 131 in which the defect list 10 is stored.

Further, after the defect entry 20 is deleted from the defect list storage buffer 131 in Step 506, the capacity of the cache buffer 132 may be increased as shown in FIG. 7.

In the present embodiment, the defect list 10 recorded on the optical disc 1 includes both of the entry 420 without replacement record and the spare attribute entry 430. However, the defect list 10 may include either one of the entry 420 without replacement record and the spare attribute entry 430.

As described above, the present invention is exemplified by the use of the preferred embodiments of the present invention. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

The present invention is particularly effective in reducing a capacity of a memory mounted on an information reproduction device, such as an optical disc device.

What is claimed is:

1. An information reproduction device, comprising:
a reproduction unit which reproduces record data recorded on an information-recording medium including a data area for recording the record data, and a defect control area for recording defect information of the data area;
a storage unit which stores the defect information; and
a reduction unit which reduces a storage area of the storage unit which is used for storing the defect information,
wherein the reduction unit includes:
a checking unit which checks whether the record data is first information or not,
a determination unit which determines whether the defect information is of the first information or not, and
a main unit which if it is determined that the defect information is of the first information, allows the storage area of the defect information to be used as an area for storing information other than defect information to reduce the storage area of the storage unit which is used for storing defect information, and
wherein the first information is AV data.

2. The information reproduction device of claim 1, wherein the first information is required to be reproduced from the information-recording medium at a transfer rate equal to or higher than a predetermined transfer rate.

3. An information reproduction device, comprising:
a reproduction unit which reproduces record data recorded on an information-recording medium including a data area for recording the record data, and a defect control area for recording defect information of the data area;
a storage unit which stores the defect information; and
a reduction unit which reduces a storage area of the storage unit which is used for storing the defect information,
wherein the reduction unit includes:
a determination unit which determines whether a reproduction request from an upper device is a request to reproduce first information or not, and
a main unit which if it is determined that the reproduction request from the upper device is a request to reproduce the first information, allows the storage area of the defect information to be used as an area for storing information other than defect information to reduce the storage area of the storage unit which is used for storing defect information, and
wherein the first information is AV data.

4. The information reproduction device of claim 3, wherein the first information is required to be reproduced from the information-recording medium at a transfer rate equal to or higher than a predetermined transfer rate.

5. The information reproduction device of claim 3, wherein the defect information recorded in the defect control area of the information-recording medium includes at least one of information which indicates that data of a defect block is not recorded in a replacement destination block, or information which indicates that a block in a replacement area is not used, and
the reduction unit allows a storage area of the information included in the defect information which indicates that data of a defect block is not recorded in a replacement destination block, to be used as an area for storing information other than defect information to reduce the storage area of the storage unit which is used for storing defect information.

6. The information reproduction device of claim 3, wherein
the defect information recorded in the defect control area of the information-recording medium includes at least one of information which indicates that data of a defect block is not recorded in a replacement destination block, or information which indicates that a block in a replacement area is not used, and the reduction unit allows a storage area of the information included in the defect information which indicates that the block in the replacement area is not used, to be used as an area for storing information other than defect information to reduce the storage area of the storage unit which is used for storing defect information.

7. A method for reproducing information, comprising:

reproducing record data recorded on an information-recording medium including a data area for recording the record data, and a defect control area for recording defect information of the data area;

storing the defect information in a storage unit; and reducing a storage area of the storage unit which is used for storing the defect information, wherein the reducing of the storage area includes:
checking whether the record data is first information or not,
determining whether the defect information is of the first information or not, and
if it is determined that the defect information is of the first information, allowing the storage area of the defect information to be used as an area for storing information other than defect information to reduce the storage area of the storage unit which is used for storing defect information, and wherein the first information is AV data.

8. The method of claim 7, wherein the first information is required to be reproduced from the information-recording medium at a transfer rate equal to or higher than a predetermined transfer rate.

9. A method for reproducing information, comprising:

reproducing record data recorded on an information-recording medium including a data area for recording the record data, and a defect control area for recording defect information of the data area;

storing the defect information in a storage unit; and reducing a storage area of the storage unit which is used for storing the defect information, wherein the reducing of the storage area includes:
determining whether a reproduction request from an upper device is a request to reproduce first information or not, and
if it is determined that the reproduction request from the upper device is a request to reproduce the first information, allowing the storage area of the defect information to be used as an area for storing information other than defect information to reduce the storage area of the storage unit which is used for storing defect information, and wherein the first information is AV data.

10. The method of claim 9, wherein the first information is required to be reproduced from the information-recording medium at a transfer rate equal to or higher than a predetermined transfer rate.

11. The method of claim 9, wherein the defect information recorded in the defect control area of the information-recording medium includes at least one of information which indicates that data of a defect block is not recorded in a replacement destination block, or information which indicates that a block in a replacement area is not used, and the reducing of the storage area is allowing a storage area of the information included in the defect information which indicates that data of a defect block is not recorded in a replacement destination block, to be used as an area for storing information other than defect information to reduce the storage area of the storage unit which is used for storing defect information.

12. The method of claim 9, wherein the defect information recorded in the defect control area of the information-recording medium includes at least one of information which indicates that data of a defect block is not recorded in a replacement destination block, or information which indicates that a block in a replacement area is not used, and the reducing of the storage area is allowing a storage area of the information included in the defect information which indicates that the block in the replacement area is not used, to be used as an area for storing information other than defect information to reduce the storage area of the storage unit which is used for storing defect information.

\* \* \* \* \*